United States Patent [19]

Garrison

[11] 4,188,818
[45] Feb. 19, 1980

[54] MECHANISM FOR LEAK TESTING OF HERMETICALLY SEALED VESSELS

[75] Inventor: Charles G. Garrison, San Jose, Calif.

[73] Assignee: Teledyne McCormick Selph (an operating division of Teledyne Industries, Inc.), Hollister, Calif.

[21] Appl. No.: 948,455

[22] Filed: Oct. 4, 1978

[51] Int. Cl.² .................................................. G01M 3/20
[52] U.S. Cl. ...................................... 73/40.7; 73/49.3
[58] Field of Search .................... 73/40.7, 49.3, 37, 52

[56] References Cited

U.S. PATENT DOCUMENTS

| | | | |
|---|---|---|---|
| 1,933,791 | 11/1933 | Crouch | 73/40.7 X |
| 2,391,354 | 12/1945 | Slosberg | 73/49.3 X |
| 2,634,814 | 4/1953 | Allen | 141/19 X |
| 2,682,967 | 7/1954 | Hill | 222/5 X |
| 3,003,349 | 10/1961 | Sullivan et al. | 73/49.3 X |
| 3,186,214 | 6/1965 | Roberts | 73/40.7 |
| 3,247,706 | 4/1966 | Rose et al. | 73/40.7 |
| 3,298,571 | 1/1967 | Novak | 222/5 |
| 3,487,677 | 1/1970 | Molitor | 73/40.7 |
| 3,577,769 | 5/1971 | Roberts | 73/40.7 |
| 3,645,127 | 2/1972 | Mongodin et al. | 73/40.7 |
| 3,795,147 | 3/1974 | Peterson et al. | 73/49.3 |
| 3,865,158 | 2/1975 | Withrow | 141/19 |
| 4,080,822 | 3/1978 | Stenbäck | 73/40.7 |

FOREIGN PATENT DOCUMENTS 1218753  6/1966  Fed. Rep. of Germany ............ 73/40.7

*Primary Examiner*—Gerald Goldberg
*Assistant Examiner*—Joseph W. Roskos
*Attorney, Agent, or Firm*—David H. Semmes; Warren E. Olsen

[57] ABSTRACT

A self-contained device for selectively discharging a pressurized gas within a hermetically sealed vessel to which it has been sealed, to enable a leak testing of the vessel. A linear actuator is functioned to open a small, high pressure cylinder that has been charged with a detector gas. The mechanism is preferably mounted to the interior of a lid which is then sealed onto the vessel which is to be tested. Proper functioning of the device may be confirmed electrically, since circuit continuity between an electrical contact pin and at least one additional portion on the exterior surface of the vessel will be permanently broken after proper functioning.

10 Claims, 4 Drawing Figures

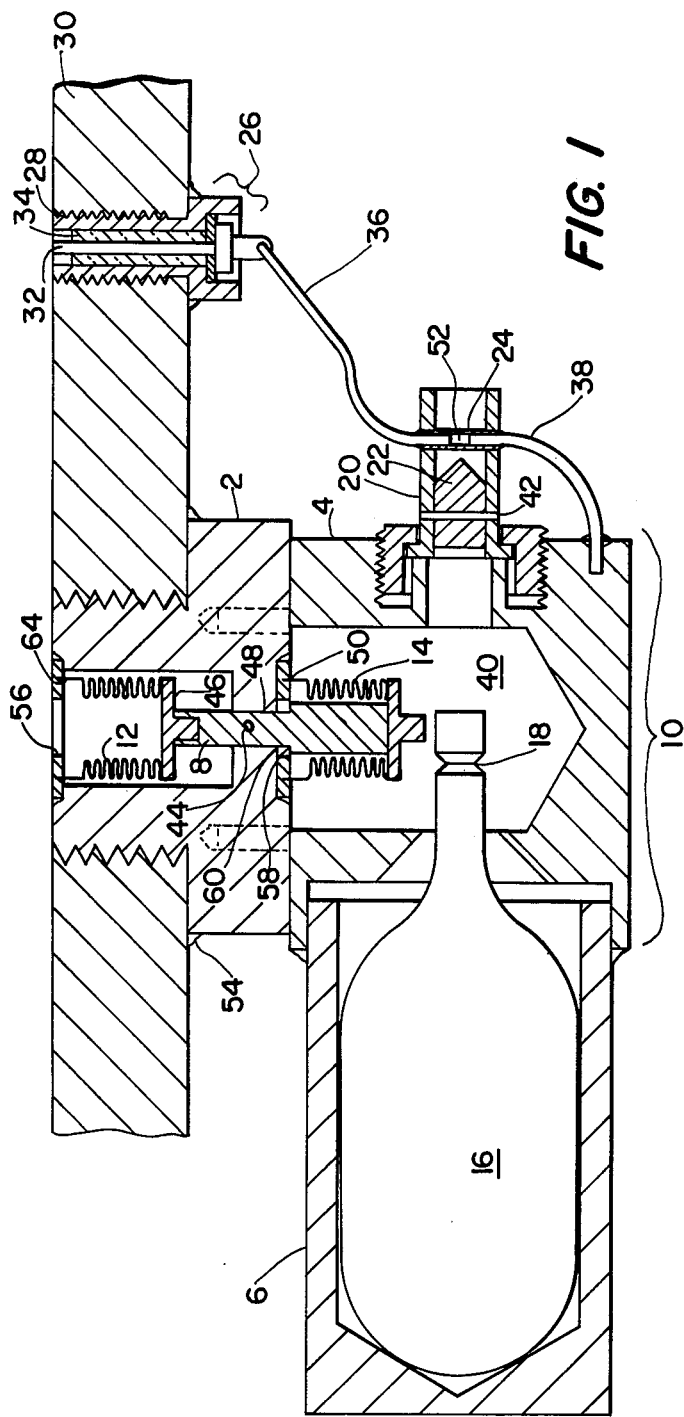
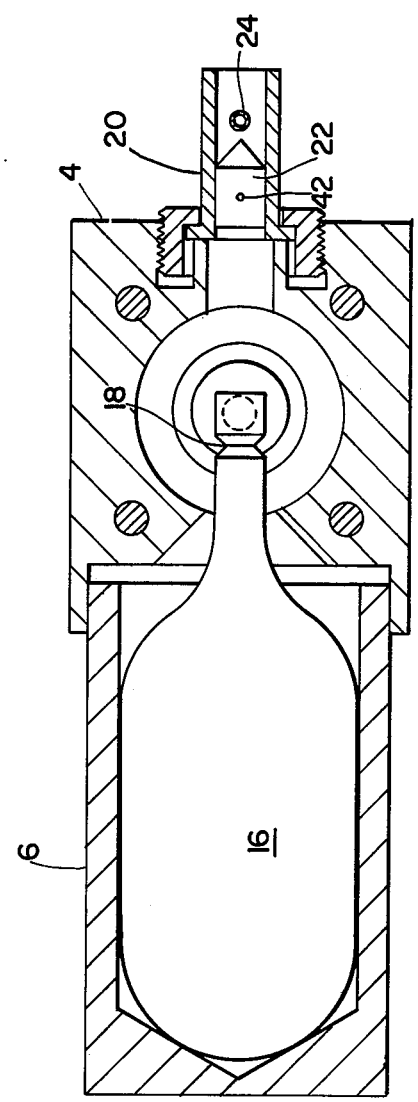

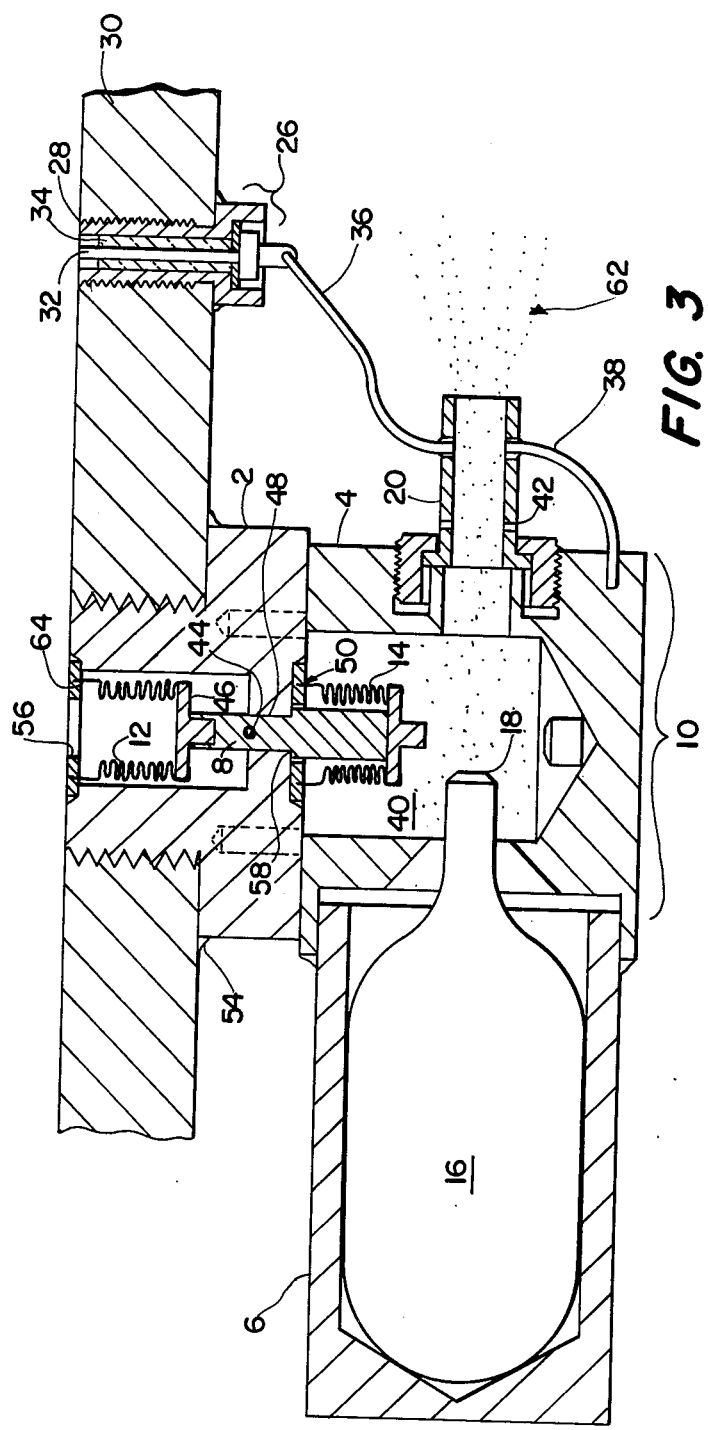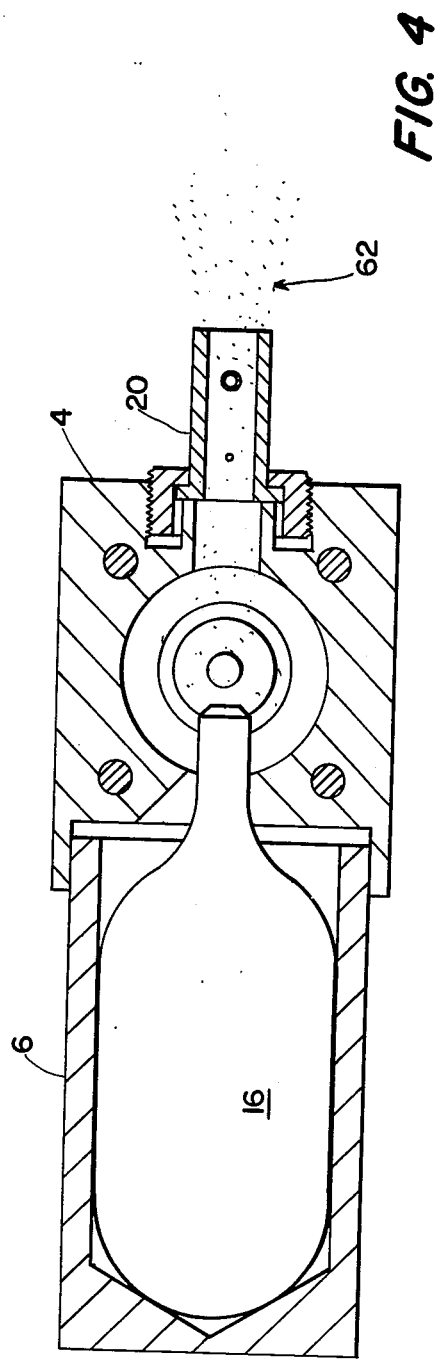

MECHANISM FOR LEAK TESTING OF HERMETICALLY SEALED VESSELS

BACKGROUND OF THE INVENTION

1. Field of the Invention

The present invention relates to a mechanism to enable leak testing of a previously sealed vessel, at any time after the vessel has been sealed. The present invention consists of a self-contained source of pressurized gas which can be discharged to the interior of a sealed vessel by a simple mechanical actuation from exterior of the vessel, without the need for any through-container valving to supply the source of pressurized gas. The invention generally relates to leak testing, and has a particular utility for testing the seal of containers which contain hostile materials, such as nuclear waste.

2. Description of the Prior Art

The present invention deals with a mechanism that has particular utility in the field of leak detection of sealed containers. The present mechanism has particular utility in connection with leak testing of sealed vessels which contain highly harmful materials, such as carcinogenic materials or radioactive materials. It is known to introduce a source of gas pressure inside a sealed vessel through certain valving arrangements, and then to sniff or otherwise sense or detect exteriorly of the container for leaks. However, one objective of the present invention is to avoid any through-container communications, by employing an integrally mounted housing that includes its own source of high pressure testing gas.

The present invention relates to leak testing of hermetically sealed vessels, and the invention itself is a mechanism for selectively discharging pressurized gas within a hermetically sealed vessel. Accordingly, applicant wishes to make of record certain prior art teachings which are presently known to him, as follows: U.S. Pat. Nos. Crouch, 1,933,791; Slosberg, 2,391,354; Allen, 2,634,814; Hill, 2,682,967; Sullivan, 3,003,349; Roberts, 3,186,214; Rose, 3,247,706; Novak, 3,298,571; Molitor, 3,487,677; Roberts, 3,577,769; Mongodin, 3,645,127; Withrow, 3,865,158; Stenbäck, 4,080,822.

Various of these prior art patents illustrate devices for discharging gases, and certain other of these prior art patents illustrate, generally, the field of leak testing to which the present invention is directed. While certain of these patents are from nonanalogous areas, a brief commentary of all possibly pertinent prior art is considered appropriate, for a most complete understanding of the present invention.

Hill illustrates a fire extinguisher device which generates internal pressure by piercing a cartridge with a valve that is suspended from the lid of a container. The patents to Allen and Withrow illustrate similar fire extinguisher devices that include an internally mounted source of pressurized gas, which can be released to dispense fluid from within the container. In each of these nonanalogous fire extinguisher devices there is no need for maintaining a hermetic seal both before and during actuation, and the actuator itself relies upon rubber valving seal elements to prevent loss of pressure. Additionally, none of these fire extinguisher patents have any need for a subsequent and positive manner of ascertaining that there has been actuation of an internally mounted pressure source.

Novak illustrates a mechanism for inflating a body, wherein a compressed gas source is located within the body and a valve means is provided to discharge the gas. The Novak teachings relate to a device for filling an inflatable body, and also include neither a positive hermetic seal structure between the actuator and the housing, nor a positive manner of determining that there has been actuation.

Stenback illustrates one method for leak testing a transport vessel which contains radioactive material, and in that sense is analogous to the field of the present invention. Stenback places a source of tracer gas, such as helium, and a separate pressurizing gas into a vessel before it is sealed. The gases mix by a subsequent diffusion mechanism and thereby generate an internal pressure. In contrast, the present invention allows a selective pressure actuation within a hermetically sealed container, without regard to the amount of time which has elapsed since the container was sealed.

Slosberg teaches a method for testing sealed cans for leaks, through adding a block of solid carbon dioxide to the can's liquid contents before sealing. The carbon dioxide diffuses within the can and generates a pressure, which will distend the wall of the can if there is no leak.

Molitor is noted to show one type of system for leak detection, wherein a container is positioned within a larger vessel and then both are evacuated. As is conventional practice, a detector fluid, such as helium, is introduced into the container so that leakage into the larger vessel can be measured by a mass spectrometer. This patent illustrates the field of invention to which the present device is directed, and is noted to illustrate conventional leak-testing techniques.

Likewise, Roberts illustrates a test unit which employs both a tracer gas, and a pressurizing gas which must be introduced into the test unit itself. By contrast, the present invention avoids the necessity of introducing a test gas from an external source. The early patent to Crouch is noted to show that one of the preferred gases employed herein, i.e., helium, is well-known as a medium for leak detection.

Sullivan is noted to illustrate an unrelated manner of revealing leakage of a radioactive material, wherein the material is cladded with an internal space, which holds a warning material. Sullivan illustrates an approach to the problem of radioactive leakage wherein a characteristic smell supplies the warning.

The patent to Rose is noted to illustrate yet another method for testing leaks, and particularly a leak within a nuclear fuel element. The fuel element is subjected to an atmosphere of helium, wherein some of the helium is absorbed. The patent is primarily of interest to show the magnitude of helium leakage which can be measured, and is not considered otherwise pertinent. The patent to Roberts is cited to show a prior art type of system for testing a container, such as freon-containing refrigeration coils, for leaks. A container is positioned within a chamber, and a tracer gas is introduced through a valving member. Any leak consequently shows up in the atmosphere of the chamber, through analysis of the chamber contents. Improvements in the present invention go to the complete avoidance of any external tracer gas, since all tracer gas and actuation means are integrally located within the container.

Finally, Mongodin illustrates one type of hand probe device which can be applied to the exterior of the vessel that has previously been pressurized with the tracer gas. Mongodin is noted simply to illustrate further the field of the present invention, and one type of external sensing device which may be employed to determine whether or not a vessel including the improvements of the present invention has a leak.

SUMMARY OF THE INVENTION

It is a primary object of the present invention to teach a mechanism which will enable retesting of a hermetically sealed vessel after the vessel has been sealed, and in response to a selective actuation of the testing sequence. The present mechanism can be easily installed into any vessel or container, and will allow the container to still be hermetically sealed by welding, or other equivalent means. Subsequent to the sealing of the vessel, the system can be activated by an externally applied mechanical force without comprise to the seal of the vessel.

In vessels or containers designed to store radioactive materials, radioactive waste, and chemicals or other such hostile materials, it is frequently desirable or mandatory to hermetically seal these vessels prior to or after shipment or storage. In many instances it is necessary to accomplish this leak testing through remote means, and in most cases it would be preferable to eliminate any through-wall vessel ports or valves which could result in secondary seals and, therefore, secondary leak paths during storage or shipment. Accordingly, it is the object of the present invention to teach a mechanism which will avoid any secondary sealing problems, and yet allow selective testing of a hermetically sealed container at any time.

The present invention is intended to be used with conventional methodologies of testing for release of a leak test medium, for example, as discussed in the patents above. The present invention is a device which will enable the release of the test medium, and thereafter standard helium mass spectrometer or Radiflo leak test techniques, for example, can then be easily employed. The present invention is not specific to any new methodology for determining a vessel leakage rate, but rather involves a new manner of insuring positive actuation of a gas within such a leakage testing system.

The present invention has particular utility in the field of radioactive wastes, though the present invention is not limited to testing the seal around such materials. The prior art recognizes that helium is well suited as a test gas medium, since helium is foreign to the radioactive environment, and very small concentrations can be detected with known mass spectrometer techniques and equipment. Gases useful as a test medium within the present invention include helium and members of the halogen family. Of course, if the present invention is being applied to a chemical storage system wherein helium or halogen gases would not be compatible, then the use of a radioactive medium such as krypton-85 may easily be used, with the appropriate sensing equipment. Leak testing with such radioactive detector mediums is commonly called Radiflo testing in the art, and the type of gas and analytical system used forms no critical part of the present invention.

A primary advantage of the present invention is the ability to release a leak test medium without compromising the integrity of the vessel. A significant further advantage is the ability to verify whether the tracer gas has been released, in fact, to preclude the false indication of a hermetic seal when in fact the seal is no longer hermetic. The preferred embodiment of the present invention is constructed entirely of materials which would be compatible with expectable internal container environments. For example, since the present invention has particular utility with the storage of radioactive wastes, all organic compounds are specifically excluded as material choices, in view of the possibility of their degradation and subsequent violation of container integrity. The entire system is constructed of inorganic materials, such as metals, ceramics, or glass components which in each case are either weldable or fusable in order to eliminate mechanical, chemical or thermal radiation damage/degradation effects which might otherwise be expectable. The choice of materials herein has been made to ensure maximum reliability, and compatibility to various hostile environments.

Other advantages of the present mechanism for leak testing of hermetically sealed vessels will be apparent from the detailed description which follows, in which reference is made to the accompanying drawings.

BRIEF DESCRIPTION OF THE DRAWINGS

FIG. 1 is a sectioned elevational view of the present invention, according to a preferred embodiment;

FIG. 2 is a top plan view of the preferred embodiment, in cross-section;

FIG. 3 is a schematic representation of the embodiment of FIG. 1 after actuation;

FIG. 4 is a schematic representation corresponding to a top view of FIG. 3.

DESCRIPTION OF THE PREFERRED EMBODIMENT

The preferred embodiment of the present invention is illustrated in its preactuation condition in FIGS. 1 and 2, and in a post-actuation mode in FIGS. 3 and 4.

The actuator mechanism enables testing of a hermetically sealed vessel, after the vessel is sealed, and is self-contained within a housing, 10, which is operable to be mounted from an interior wall surface of any vessel before that vessel is hermetically sealed. In the preferred embodiment of FIG. 1, the housing includes an adaptor, 2, and a main body portion, 4, with the adaptor shown welded to the interior side of a vessel wall surface, 30. Within the housing there is a source of gas pressure, 16, and in FIG. 1 the preferred embodiment includes a cylinder which is valved by a frangible connection, 18. The housing defines a closed volume space, 40, and a means to selectively communicate any gas pressure within this closed volume space outwardly therefrom, and into the interior of the vessel.

In the preferred embodiment, the means to communicate the gas pressure from within the housing to points exterior to the housing is a sensor switch assembly, broadly shown at 20. The sensor switch assembly functions as a valve means, and comprises a bore, through the wall of the housing. Within the bore is a piston, 22, which is adapted to be ejected from this bore when pressure within the closed volume, 40, reaches or exceeds a threshold value. The sensor switch valve means also preferably includes a frangible sensing link, 24, spaced across the bore between the piston, 22, and the exterior of the housing. The sensor piston, 22, is maintained in its rest or initial position by a frangible pin, 42, which will prevent ejection of the piston unless the pressure difference between the interior and exterior of the vessel exceeds a critical shearing value.

A significant feature of the present invention resides in the manner in which actuation releases the stored gas pressure, while maintaining a hermetic seal between the interior and exterior of a vessel in which the present invention is mounted. The actuator means consists of a movable member, 8, which may also be described as a bellows shaft. The bellows shaft has a proximate end, 46, which extends towards the first end of the housing. At this first end of the housing there is an aperture, 56, which is open to the exterior of the vessel wall to which the device is mounted. This mounting is preferably accomplished by the adaptor portion, 2, being threadably engaged, then welded into the vessel wall, 30. The adaptor, 2, can then easily be connected to the body portion, 4, through any fastening device, such as the bolts which are shown in phantom in FIGS. 1 and 2. In the preferred embodiment the hermetic seal between the actuator shaft and the housing is accomplished by a continuous wall structure that is connected between the movable member, 8, and the housing, 2.

The continuous wall structure ensures that there is no possibility of compromise for the overall hermetic seal of the vessel. In the preferred embodiment there are two expansion joints, or bellows, 12 and 14. The upper bellows, 12, has a proximate end, 64, which is sealingly connected around the aperture, 56, so that the interior of the upper bellows is open to the exterior of the vessel in which the device is mounted. While the upper bellows, 12, supplies a continuous wall structure between the housing and the movable actuator member, a lower, or redundant, bellows shaft, 14, may also be provided between the housing and the distal end of the movable bellows shaft. The bellows shaft, 8, extends downwardly through a bore in the housing, 48, to a distal end where it is surrounded by the distal end of the lower bellows, 14. The lower bellows is of a redundant, continuous wall structure, since it is also sealed to the housing at its proximate end, 50. Downward actuation of the bellows shaft can only be accomplished by a force sufficient to shear the shear pin, 44. The land, or shoulder, 46, is a positive manner of preventing overextension and rupture of either bellows in a downward actuation mode.

The pressurized cylinder, 16, contains a leak test medium, such as helium gas under high pressure. A shear nipple, or frangible valve arrangement, 18, is presented so that it will be sheared when the actuator shaft is moved downward through its actuation length. Upon actuation the leak test medium is first sent into the closed volume, 40, to act upon the sensor switch assembly, 20 and, as shown, there will also be an impulse applied directly upon piston, 22, from the direction of gas escaping the outlet, 18. The closed volume, 40, is only communicated to the exterior of the housing, i.e., the interior of the vessel, through the selective sensor valve switch assembly, 20, as shown in FIGS. 3 and 4. When the gas pressure within the closed volume, 40, exceeds the threshold value, the shear pin, 42, will release the sensor piston, 22, which in turn shears off the frangible link, 24. The frangible link, 24, includes a central portion, 52, which is adapted to be severed, as well as a first wire conductor, 36, and a second wire conductor, 38. The first wire conductor is connected to an electrical contact pin, 32, which is mounted through a wall of part of the vessel, as by the screw adaptor, 28. This electrical contact pin is electrically insulated from the wall of the vessel by an insulating material, illustrated schematically at 34. The entire electrical contact pin assembly, 26, may be located at any point on the vessel to which the device is attached, such as the lid, 30, illustrated in FIGS. 1-4. The housing of the device is shown to be of metal construction, and a metal or other noncorrosive material is preferred for these devices. The device may be securely sealed to the container as by weldments, one shown at 54, so that there is an electrical continuity between any part of the housing and a metal vessel lid, 30. Since the electrical contact pin, 32, is electrically insulated from the vessel wall the electrical continuity between the pin and the other portion of the vessel wall will be broken if the frangible link, 52, is severed.

Operation of the device will now be further explained, together with reference to the preactuation mode illustrated in FIGS. 1 and 2, and the postactuation mode shown in FIGS. 3 and 4. Prior to release of the leak test medium the sensor switch may be checked by applying an electrical signal between any part of the metallic vessel wall, 30, and the electrical contact pin, 32. Because of the electrical continuity through the frangible link, 52, there will be a closed circuit condition. As shown in FIG. 3, severing the frangible link will break the electrical continuity between the contact pin, 32, and any other part of the housing, thereby producing an open circuit to any electrical continuity check.

The movable bellows shaft, 8, must be mechanically stroked by a force applied in a direction normal to the lid, 30. A stroke distance of approximately one inch is illustrated for the preferred embodiment. The system may be functioned by indexing a remotely controlled head which searches on top of the lid, 30, until it comes into registration with the aperture, 56. As shown at FIG. 3, the actuator shaft may also include a shoulder, 58, which will limit the upward movement of the actuator shaft, in response to the pressure generated within the closed volume, 40. This shoulder, 58, may conveniently contact an annular housing surface, 60, to prevent any excursion of the actuator shaft upwardly past the position shown in FIG. 3. It should be apparent that a continuous wall structure between the movable actuator and the housing of the device is defined redundantly by the separate metal expansion joints, or bellows, at 12 and 14. Additionally, protection of these expansion joints against failure is assured by the selective provision of abutting lands to prevent over excursion of the actuator shaft at any time of the actuation sequence.

In FIGS. 3 and 4 the escaping gas is graphically represented as a mist, for convenience only. As earlier discussed, any tracer gases useful include helium, and members of the halogen family, when the vessel contains radioactive material. Alternatively, a radioactive gas may be employed, such as krypton-85, without alteration to the design of the mechanism presented herein, if a Radiflo leak test method is indicated for the particular vessel.

While significant advantages and features of the present invention have been disclosed and illustrated with respect to the preferred embodiment, it is to be understood that the present invention is to be defined by the scope of the appended claims.

I claim:

1. A mechanism to enable leak testing of a hermetically sealed vessel after said vessel has been sealed comprising, in combination:

A. a housing operable to be mounted interiorly and from an interior wall surface of a vessel before said vessel is hermetically sealed, said housing including there within a source of gas pressure and a means for selectively communicating said gas pressure outwardly therefrom, and into the hermetically sealed interior of said vessel; and B. an actuator means for releasing said source of gas pressure while maintaining a hermetic seal between the interior and exterior of said vessel, said actuator means further comprising an actuator member which is movable by application of an externally applied force and a continuous wall structure which is connected between said movable member and said housing to maintain said hermetic seal, whereby gas pressure may be selectively released into the interior of said vessel to enable the vessel to be externally checked for leakage.

2. A mechanism according to claim 1 wherein said continuous wall structure comprises at least one bellows that has a proximate end which is sealingly connected to said movable member, wherein further the movable member comprises a bellows shaft having a proximate end extending towards a first end of said housing that includes an aperture open to the exterior of the vessel wall to which it is mounted.

3. A mechanism according to claim 2 wherein said housing further comprises an adaptor portion, that is operable to be sealingly mounted to a vessel wall surface, and a body portion, sealingly engaged to said adaptor portion and extending therefrom, wherein further said continuous wall structure further comprises a second bellows which has a proximate end which is sealingly connected around said aperture so that the interior of said second bellows is open to the exterior of said vessel and in a surrounding relation to the proximate end of the bellows shaft, wherein further said bellows shaft extends through a bore within said housing to a distal end which is sealingly connected and surrounded by the distal end of said first bellows, wherein the distal end of said shaft is operable to release said gas pressure by being urged into contact with said source of gas pressure.

4. A device according to claim 2 wherein said distal end of said bellows shaft is located within a closed volume of said housing, and this closed volume is communicated to the interior of said vessel through said selective gas communicating means, which further comprises a sensor switch valve means operable to open communication when a gas pressure within said closed volume exceeds a threshold value.

5. A mechanism according to claim 4 wherein said sensor switch valve means further comprises a bore extending between the interior of said housing in the interior of said vessel, said bore including a piston therewithin which is adapted to be ejected from said bore when said pressure within the closed volume reaches a threshold value, wherein further a frangible sensing link extends through said bore and is adapted to be severed when the piston is ejected from said bore.

6. A mechanism according to claim 5 wherein said frangible sensing link normally defines an electrically conductive path between an exterior portion of said vessel and an electrical contact pin that extends through a portion of said vessel wall and is electrically insulated therefrom, whereby release of said gas pressure into said vessel opens said electrical continuity between the electrical contact pin and said exterior portion of the vessel.

7. A mechanism according to claim 6 wherein said vessel and said housing are comprised of electrically conductive material and the entire wall surface of said vessel is normally electrically continuous to said electrical contact pin.

8. A mechanism for selectively discharging a pressurized gas within a hermetically sealed vessel comprising, in combination:

A. a housing operable to be mounted from an interior wall surface from said vessel before said vessel is hermetically sealed, said vessel including therewithin a source of gas pressure;

B. an actuator means extending from within said housing to a point proximate and open to the exterior of said vessel for selectively releasing said gas pressure while maintaining a hermetic seal between the interior and exterior of said vessel; and C. a sensor switch assembly means between the interior of said housing and the interior of said vessel that is operable to allow an external confirmation of passage of said gas pressure into the interior of said vessel through a check for electrical continuity between an electric contact pin and at least one additional portion on the exterior surface of said vessel.

9. A mechanism according to claim 8 wherein said sensor switch assembly further comprises a frangible sensing link, which is broken by the expulsion of a piston member in response to a threshold gas pressure that is generated within an initially closed volume of said housing upon said actuation.

10. A mechanism according to claims 8 or 9 wherein said actuator means further comprises at least one metal bellows which is sealingly connected, at its proximate end, to a portion of said housing and sealingly connected, at its distal end, to a bellows shaft which is operable to be stoked into contact with said source of gas pressure by a force applied from outside said vessel.

* * * * *